United States Patent
Turpin et al.

(10) Patent No.: US 8,035,943 B2
(45) Date of Patent: Oct. 11, 2011

(54) PROTECTION CIRCUIT APPARATUS

(75) Inventors: Pierre Turpin, Toulouse (FR); Jeffrey T. Reiter, Dearborn, MI (US)

(73) Assignee: Freescale Semiconductor, Inc., Austin, TX (US)

(*) Notice: Subject to any disclaimer, the term of this patent is extended or adjusted under 35 U.S.C. 154(b) by 271 days.

(21) Appl. No.: 12/377,807

(22) PCT Filed: Aug. 23, 2006

(86) PCT No.: PCT/IB2006/054090
§ 371 (c)(1),
(2), (4) Date: Feb. 17, 2009

(87) PCT Pub. No.: WO2008/023221
PCT Pub. Date: Feb. 28, 2008

(65) Prior Publication Data
US 2010/0165529 A1   Jul. 1, 2010

(51) Int. Cl.
*H02H 9/08* (2006.01)
*H02H 9/02* (2006.01)

(52) U.S. Cl. .................................. 361/93.9; 361/101
(58) Field of Classification Search ............. 361/93.9, 361/101
See application file for complete search history.

(56) References Cited

U.S. PATENT DOCUMENTS
5,926,354 A    7/1999  King
6,710,698 B1 *  3/2004  Jehlicka et al. ............... 337/221

FOREIGN PATENT DOCUMENTS
DE   19941699 A1   3/2001
* cited by examiner

*Primary Examiner* — Ronald W Leja

(57) ABSTRACT

A protection circuit apparatus comprises a retriggerable fuse having an awakened state and a sleep state. The retriggerable fuse has an input and an output and is arranged, when in the awakened state, to selectively prevent a load current from flowing from the input to the output in response to the load current exceeding a first current threshold. An activation circuit is also provided and is arranged to sense the load current being drawn. The activation circuit causes the retriggerable fuse to enter the awakened state from the sleep state when the sensed load current exceeds a second current threshold.

20 Claims, 2 Drawing Sheets

PROTECTION CIRCUIT APPARATUS

FIELD OF THE INVENTION

This invention relates to a protection circuit apparatus of the type that, for example, comprises a retriggerable fuse having an awakened state and a sleep state, the retriggerable fuse being capable, when in the awakened state, of selectively permitting a load current to flow therethrough.

BACKGROUND OF THE INVENTION

In the field of circuit protection, particularly in the automotive industry, it has traditionally been the case that an electronic circuit constituting a load, for example an audio entertainment system, coupled to a power supply system of an automobile has been protected by metallic fuses employing so-called "fuse wire" or metal that bridges a pair of contacts and melts when a current flowing through the wire exceeds a maximum current rating associated with the metal. Such fuses are provided in disposable packages that can be plugged and unplugged into a fuse board within a vehicle, for example so-called "blade" fuses. In this respect, such disposable fuses, in addition to being environmentally unfriendly, require the express provision of the fuse board within the vehicle that has to be easily accessible in order to replace one or more fuses; this has a limiting effect upon automotive design. Furthermore, the need to replace fuses is inconvenient and can result in engineering time to replace the fuses, resulting in higher maintenance costs for the vehicle as well as an increased cost in terms of consumables to an owner of the vehicle.

A resettable or retriggerable "fuse" has therefore been proposed as an alternative to traditional disposable metallic fuses. In essence, the retriggerable "fuse" is, in fact, a circuit providing current shut-off functionality in over-current situations. Such retriggerable "fuse" circuits, known as protected relay circuits, typically employ an n-channel FET as a way of protecting a load against short-circuits. However, mechanical implementations that use mechanical alternatives to the n-channel FET exist as well.

One particularly important requirement of protected relay circuits is that they must be able to provide protection to a load in a number of scenarios. For example, in addition to when the engine of the vehicle is running, the protected relay circuit needs to be in an active state and able to provide protection when the engine of the vehicle is not running, i.e. when the battery is not being recharged and power is not being provided by an alternator of the vehicle. Of course, vehicle manufacturers naturally place constraints upon power consumption by electronic devices in the vehicle when the engine is not running as the charge of the battery must not be unnecessarily drained. A number of loads in the vehicle need to draw small amounts of current, in the order of a few tens of micro-Amps, whilst the engine is not running, for example: an electronic clock and a central locking, alarm and engine immobiliser system, to name but a few.

In relation to certain electronic equipment in the vehicle, the operative state of the equipment can change, for example through user interaction, resulting in the circuits of the equipment drawing greater amounts of current (for example, up to a few Amps) without warning. The central locking, alarm and engine immobiliser system and audio (and possibly audiovisual) entertainment equipment in the vehicle are examples of such equipment.

However, since flow of a load current drawn by the equipment to be protected is relatively high, the protected relay circuit used has to have a relatively low "on" resistance, for example a low Drain-Source "on" resistance (RDSon) for FET implementations, in order to reduce power dissipating by the protected relay circuits. Additionally, such protected relay circuits require a constant bias current, which is unacceptably high, in order to switch the protected relay circuit to an "on" state and provide the necessary protection against over-current events.

Further, in order to achieve the low RDSon mentioned above, n-channel FET-based protected relay circuits require a charge pump, or periodic gate refresh circuitry. However, the provision of the charge pump or periodic gate refresh circuitry requires the protected relay circuit to draw an unacceptably high level of current in the order of at least 100 µA. As will be appreciated, repeated instances of the n-channel FET protected relay circuit to replace all or almost all fuses in the vehicle that protect the various loads contained in the vehicle with known high-side FET protected relay circuits will result in an unacceptably high current drain on the battery of the vehicle.

In contrast, p-channel FET implementations of the protected relay circuit can have reduced current requirements to drive a gate of the FET, but have higher financial costs associated with their use (due to increased die area requirements over n-channel implementations) and also require an unacceptably high bias current to provide the necessary protection required. Consequently, p-channel FET implementations are not widely employed. Also, most integrated circuit technologies and techniques are optimised for circuits employing power n-channel FETs. Additionally, p-channel FET implementations are difficult to design to achieve levels of protection comparable to those of n-channel FETs in terms of accuracy of threshold implementation for short-circuit protection.

As can be seen from the above-described known technologies, in some circumstances protected relay circuits consume unacceptably large amounts of current to provide accurate over-current protection and so are sub-optimal implementations from the point of view of vehicle manufacturers.

STATEMENT OF INVENTION

According to the present invention, there is provided a protection circuit apparatus as set forth in the appended claims.

BRIEF DESCRIPTION OF THE DRAWINGS

At least one embodiment of the invention will now be described, by way of example only, with reference to the accompanying drawings, in which.

DESCRIPTION OF PREFERRED EMBODIMENTS

Figure 1:
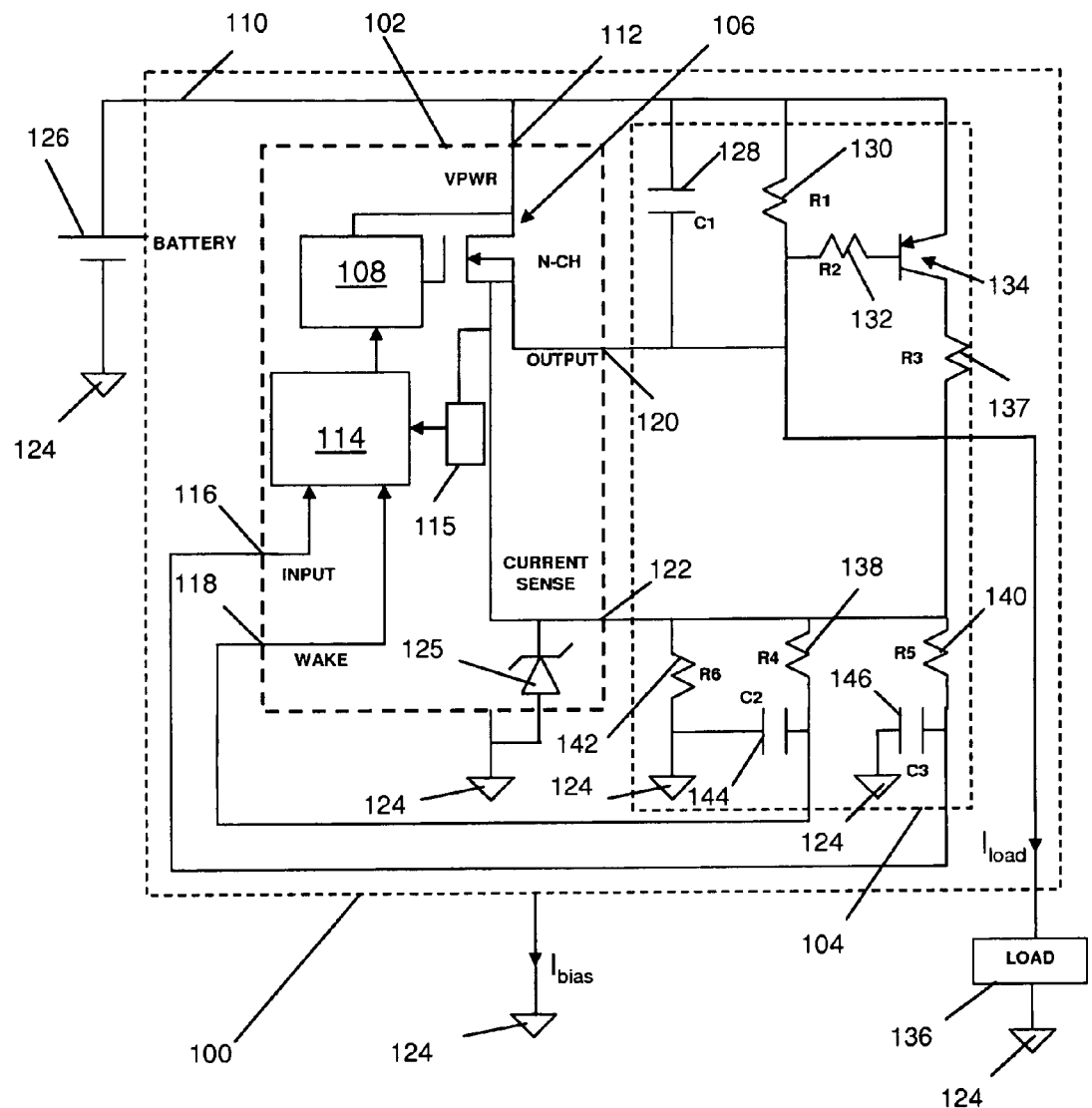
FIG. 1 is a schematic circuit diagram of a protection circuit apparatus constituting an embodiment of the invention.

Throughout the following description identical reference numerals will be used to identify like parts.

Referring to FIG. 1, a protection circuit apparatus 100 comprises a retriggerable fuse 102 and an activation circuit 104. In this example, the retriggerable fuse 102 is a solid state relay, but can be any suitable protected relay circuit or the like implemented electronically, mechanically or as a combination of the two. For example, the retriggerable fuse 102 can be any suitable electronic switching device or circuit capable of providing protection from over-current events. The retriggerable fuse 102 comprises an n-channel high-side FET switch 106, the FET 106 having a gate terminal and a drain terminal coupled to a gate driver 108 comprising a charge pump. The gate driver 108 is any suitable known circuit for driving the FET 106 or other device if used in place of the FET 106. The drain terminal of the FET 106 is coupled to a supply rail 110 and constitutes a current input 112.

The gate driver 108 is coupled to a control circuit 114 for biasing, controlling and protecting the FET 106, the control circuit 114 also being coupled to over-current circuitry 115 for detecting an over-current event. The control circuit 114 has a control input 116 and a wake-up, or awaken, input 118. Of course, in another embodiment, the control input 116 and the awaken input 118 can be provided as a single input.

A source terminal of the FET 106 constitutes a current output 120, a connection being provided to a current sense circuit (not shown), for example a supplementary sense FET operably coupled to the FET 106 as part of a current mirror circuit, in order to provide a current-sense output 122 of the retriggerable fuse 102. The current-sense output 122 is also coupled to the over-current circuitry 115. A housing (not shown) of the retriggerable fuse 102 is coupled to ground potential 124. Additionally, the current-sense output 122 is coupled to the ground potential 124 via a zener diode 125. The supply rail 110 is also coupled to the ground potential 124 via, in this example, an automotive battery 126.

The activation circuit 104 comprises a first capacitor 128 coupled between the supply rail 110 and the current output 120. Similarly, a first resistor 130 is coupled in parallel with the first capacitor 128 between the supply rail 110 and the current output 120. A second resistor 132 has a first terminal coupled to the current output 120 and a second terminal coupled to a base terminal of a PNP bipolar transistor 134; the current output 120 is also coupled to a load 136, the load 136 also being coupled to the ground potential 124. Of course, the skilled person will appreciate that any threshold-dependent conduction device can be employed and that the PNP bipolar transistor 134 is just one example of such a device. In this respect, the first resistor 130, the second resistor 132 and the threshold-dependent conduction device can be replaced by a comparator-based circuit. The first resistor 130 can be replaced by any other suitable known device or devices capable of conducting small amounts of current, for example a transistor, such as an NPN, PNP, NMOS or PMOS transistor, or an integrated circuit. In one alternative embodiment, a self-biased PNP transistor, i.e. configured as a diode, can replace the first and second resistors 130, 132 and be coupled to form a current mirror arrangement in order to monitor the current drawn by the load 136. In such an embodiment, another sense FET can be coupled to the FET 106 and the self-biased PNP transistor mentioned above.

In this example, the protection circuit apparatus 100 is being used for automotive applications and so the load 136, in this example, can be any suitable electronic equipment, for example an audio entertainment system, a digital clock, or an engine immobiliser, central locking and alarm system.

The bipolar transistor 134 has an emitter terminal coupled to the supply rail 110 and a collector terminal coupled to a first terminal of a third resistor 137. A second terminal of the third resistor 137 is coupled to first terminals of a fourth resistor 138 and a fifth resistor 140 as well as a first terminal of a sixth resistor 142.

A second terminal of the fourth resistor 138 is coupled to the awaken input 118 of the retriggerable fuse 102, a second capacitor 144 being coupled between the second terminal of the fourth resistor 138 and a second terminal of the sixth resistor 142. The second terminal of the sixth resistor 142 is also coupled to the ground potential 124. A second terminal of the fifth resistor 140 is coupled to the control input 116 of the retriggerable fuse 102, a third capacitor 146 being coupled between the second terminal of the fifth resistor 140 and the ground potential 124.

In operation (FIG. 2), the apparatus 100 is powered up. In order to explain operation of the apparatus 100 in greater detail, the apparatus 100 will now be described in the context of the load 136 being an in-vehicle audio entertainment system (not shown). However, the skilled person will appreciate that other loads can be employed in place of the in-vehicle audio entertainment system.

Initially, in this example, the load 136 is in a "standby" state and drawing a small load current, $I_{load}$, to power a clock (also not shown) provided with the in-vehicle audio entertainment system. Additionally, the retriggerable fuse 102 is in a sleep state having logic 0 signals at the control input 116 and the awaken input 118. Only a very small leakage current smaller than 1 µA, is drawn by the apparatus 100. However, it can be seen that although the retriggerable fuse 102 is in the sleep state, an alternative current path to the load 136 runs via the first resistor 130, because no current is permitted, in this example, to flow through the FET 106 when the retriggerable fuse 102 is in the sleep state. Additionally, the path to the load 136 provided via the first resistor 130 serves to allow the current drawn by the load 136 to be monitored. In this respect, as the load current, $I_{load}$, drawn by the load 136 is small, the first resistor 130 does not develop a sufficiently large detectable voltage, $V_{R1}$, across first and second terminals thereof and so the detectable voltage, $V_{R1}$, does not exceed a base-emitter voltage, $V_{be}$, of the bipolar transistor 134 (Step 200). Consequently, the bipolar transistor 134 is in an "off" state, i.e. not conducting current. The base-emitter voltage, $V_{be}$, constitutes a threshold voltage, above which the retriggerable fuse 102 has to be placed in an awakened state. This threshold voltage is associated with a threshold wake-up current, $I_{wake}$, above which the bipolar transistor 134 has to transition to an "on" state in order to change the operative state of the retriggerable fuse 102.

In the event that the in-vehicle audio entertainment system, i.e. the load 136 in this example, is switched into an "on" state from the standby state, the load current, $I_{load}$, drawn by the load 136 increases to, for example, 5A and exceeds the wake-up current, $I_{wake}$, threshold. Consequently, the detectable voltage, $V_{R1}$, developed across the first resistor 130 exceeds the base-emitter voltage, $V_{be}$, of the bipolar transistor 134. Hence, the load current, $I_{load}$, being greater than the wake-up current, $I_{wake}$, associated with the standby state, has been detected. As the detectable voltage, $V_{R1}$, is greater than the base-emitter voltage, $V_{be}$, of the bipolar transistor, the bipolar transistor 134 transitions into an "on" state and conducts current therethrough. Generation of an enable signal (Step 202) by the bipolar transistor 134 therefore results and current flows through the sixth resistor 142, resulting in the generation of a logic 1 "enable" voltage signal applied to the control input 116 and the awaken input 118. The second and third resistors 132, 137 serve to protect the bipolar transistor 134 and the control and awaken inputs 116, 118, respectively.

In response to the enable signal being applied at the control input 116 and the awaken input 118, the retriggerable fuse 102 under the control of the control circuit 114 detects (Step 204) the presence of the enable signal and enters the awakened state and switches the FET 106 into an "on" state, the load current, $I_{load}$, then beginning to flow through the FET 106. Consequently, current flowing through the first resistor 130 diminishes and so the detect voltage, $V_{R1}$, no longer exceeds the base-emitter voltage, $V_{be}$, of the bipolar transistor 134. The enable signal, generated by the bipolar transistor 134, the third resistor 137 and the sixth resister 142 in combination, therefore stops being generated and hence applied to the control input 116 and the awaken input 118. However, since the retriggerable fuse 102 is in the awakened state and the load current, $I_{load}$, is flowing through the FET 106, the retriggerable fuse 102 is detecting the load current, $I_{load}$, and generating a current-sense signal, $I_{sense}$, at the current-sense output 122 (Step 206). The current-sense signal, $I_{sense}$, is, in this example, proportional to (but considerably smaller than) the load current, $I_{load}$, but in any event indicative that the load current, $I_{load}$, has been sensed. In this respect, the current-sense signal, $I_{sense}$, is an attenuated version of the load current, $I_{load}$: $I_{load}/\beta$, where $\beta$ is a recopy ratio of the sense FET relative to the FET 106.

When an awaken trigger voltage, $V_t$, is applied at the control input 116 and the awaken input 118, the retriggerable fuse 102 can remain in the awakened state. Hence, when the current-sense signal, $I_{sense}$, exceeds a threshold current level known as a "sustain" current, $I_{sustain}$, level corresponding to:

$$\frac{V_t \beta}{R_6},$$

where $R_6$ is the resistance of the sixth resistor 142, the retriggerable fuse 102 remains in the awakened state. In this example, the current-sense signal, $I_{sense}$, flows through the sixth resistor 142 at a level exceeding the sustain current, $I_{sustain}$, level and so maintains the logic 1 voltage signal at the control input 116 and the awaken input 118 of the retriggerable fuse 102, thereby maintaining the retriggerable fuse 102 in the awakened state. Hence, it can be seen that the retriggerable fuse 102 can be latched in the awakened state through use of the current-sense signal, $I_{sense}$, to generate the enable signal.

Of course, the skilled person will appreciate that the retriggerable fuse 102 may already be in the awakened state, for example, the awakened state may automatically be entered when an engine of a vehicle is started.

Once the load 136 returns to the standby state, the load current, $I_{load}$, flowing through the FET 106 diminishes and so the current-sense signal, $I_{sense}$, also diminishes below the sustain current, $I_{sustain}$, level necessary to maintain the enable voltage signal at the control and awaken inputs 116, 118. Additionally, the current flowing through the first resistor 130 is below the wake-up current, $I_{wake}$, threshold and so is insufficient to result in the detectable voltage, $V_{R1}$, exceeding the base-emitter voltage, $V_{be}$, of the bipolar transistor 134.

Figure 2:
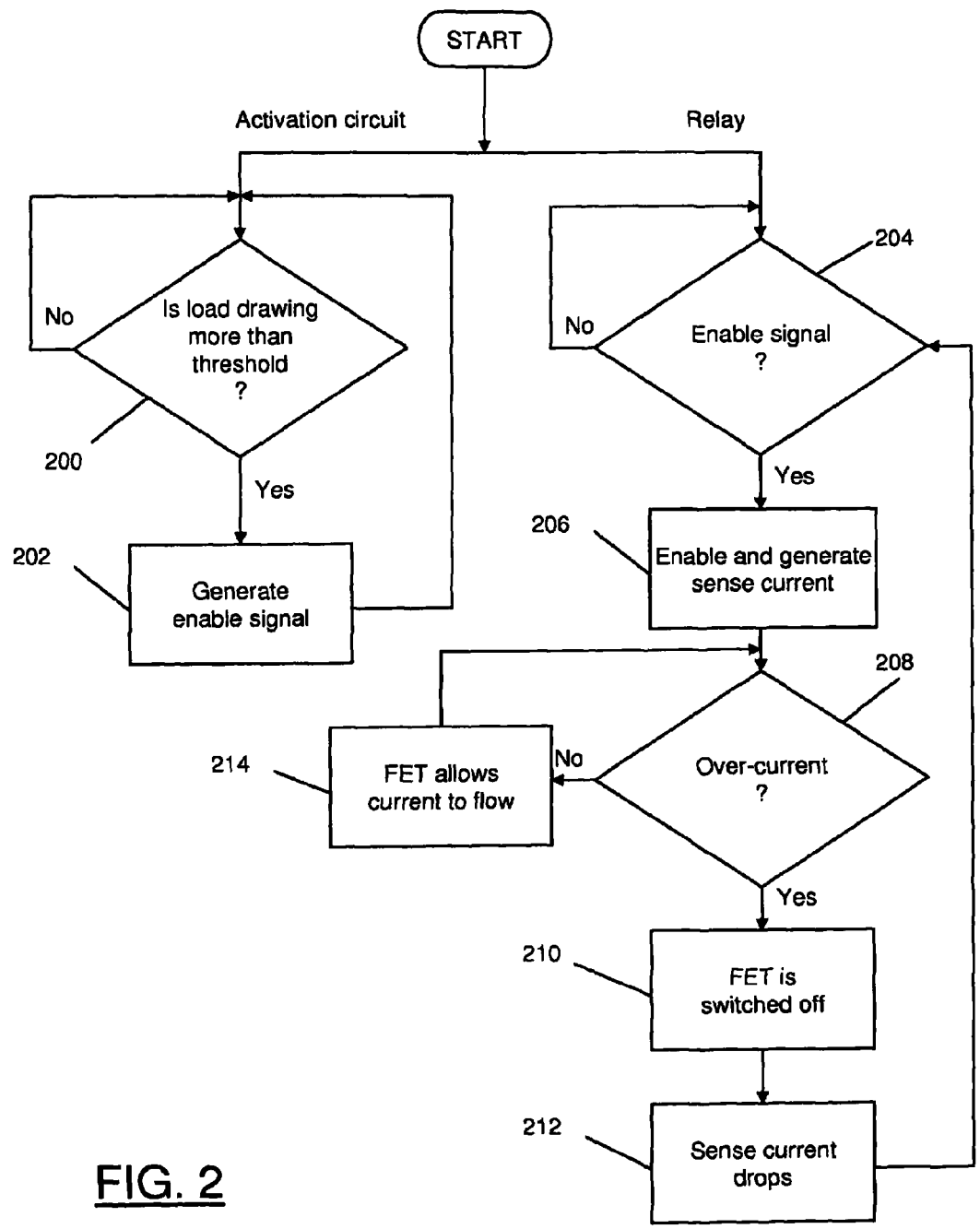
FIG. 2 is a flow diagram of operation of the circuit of FIG. 1.

Consequently, the enable signal cannot be generated and hence be present at the control input 116 and the awaken input 118, resulting in the retriggerable fuse 102 reverting to the sleep state (not shown in FIG. 2).

In contrast, in the event that the load current, $I_{load}$, increases to or exceeds a level where an over-current event is considered to have taken place, for example, as a result of a short-circuit (Step 208), the over-current circuitry 115 detects the over-current event, and using the control circuit 114, instructs the gate driver 108 to place the FET 106 in an "off" state (Step 210). The instruction to turn the FET 106 off is in response to the load current, $I_{load}$, exceeding an overcurrent threshold, $I_{overcurrent}$, and is a latched signal that is not released until the retriggerable fuse 102 reverts to the sleep state. The overcurrent threshold, $I_{overcurrent}$, corresponds to a determination that the over-current event is taking place, i.e. the load current has reached or exceeded the level mentioned above in relation to the overcurrent event.

Consequently, the, now excessive, load current, $I_{load}$, ceases to flow through the FET 106 and so protection is provided to the load 136. This is part of the normal known operating procedure of the retriggerable fuse 102. Of course, once the load current, $I_{load}$, no longer flows through the retriggerable fuse 102, the current-sense signal is extinguished (Step 212). However, the load current, $I_{load}$, then flows through the first resistor 130, the value of the first resistor 130 being sufficiently high to sustain high voltages thereacross, and results in the detect voltage, $V_{R1}$, exceeding the base-emitter voltage, $V_{be}$, and so the bipolar transistor 134, the third resistor 136 and the sixth resistor 142 operating in combination, resume generating the enable signal, thereby retaining the retriggerable fuse 102 in the awakened state with the FET 106 in the "off" state.

Once the short-circuit has been removed and the overcurrent event has finished, the load current, $I_{load}$, returns to the level associated with the load 136 being in the "on" state. The retriggerable fuse 102 therefore remains in the awakened state as the detect voltage, $V_{R1}$, is still greater than the base-emitter voltage, $V_{be}$, of the bipolar transistor 134. The FET 106 thus remains latched in the "off" state due to the previous occurrence of the over-current event. However, if the load 136 is returned to the standby state, for example by a user, the detect voltage, $V_{R1}$, falls below the base-emitter voltage, $V_{be}$, of the bipolar transistor 134 and so is insufficient to cause the enable signal to be provided at the control and awaken inputs 116, 118 by the activation circuit 104. Consequently, the retriggerable fuse 102 reverts to the sleep state, resulting in the latch signal no longer being applied by the over-current circuitry 115 to the gate driver 108 via the control circuit 114.

A processing resource, for example a microcontroller, can be coupled to the retriggerable fuse 102 in order to override the actions of the activation circuit 104 in response to an external stimulus, for example an override signal to instruct removal of the latch signal without needing the load 136 to enter the standby state. In this respect, the fourth resistor 138 and the second capacitor 144, and the fifth resistor 140 and the third capacitor 146 serve to "condition", by limiting and filtering, the enable signal that can be generated by the bipolar transistor 134 prior to use by the microcontroller.

Of course, the skilled person will appreciate that even if the retriggerable fuse 102 is in the sleep state when the over-current event occurs, the sudden presence of the excessive load current, $I_{load}$, is sufficient to cause the bipolar transistor 134 and the third resistor 137 to generate the enable signal causing the retriggerable fuse 102 to enter the awakened state, detect that the overcurrent threshold, $I_{overcurrent}$, has been exceeded and cause the FET 106 to stop conducting current, thereby protecting the load 136 from the over-current event.

In another embodiment, the first resistor 130 can be replaced by modifying the configuration of the retriggerable fuse 102. Instead of providing the first resistor 130, the gate driver 108 can be modified so that the FET 106 operates as a transdiode when the retriggerable fuse 102 is in the sleep state and the potential of the battery 126 or a slightly higher potential can be applied to the gate of the FET 106. In this configuration, the small load current required to power, for example, the clock of the in-vehicle audio entertainment system is provided via the FET 106 instead of the first resistor 130 when the retriggerable fuse 102 is in the sleep state.

In this and other embodiments, the second resistor 132 is also not employed and the current drawn by the load 136 can be measured by coupling another PNP transistor to the bipolar transistor 134, as already described above, to form a current mirror arrangement, the current mirror being coupled to another sense FET (not shown) that is, in turn, coupled to the FET 106 in order to obtain a copy of current flowing through the FET 106 when the retriggerable fuse 102 is in the sleep state.

Additionally or alternatively, the use of the sixth resistor 142 can be obviated by providing an open node signal generator. The open node signal generator can be provided by coupling a buffer between the output of the current sense circuit of the retriggerable fuse 102 described above and the first terminals of the fourth and fifth resistors 138, 140 so that the fourth and fifth resistors 138, 140 are disposed between an output of the buffer and the second and third capacitors 144, 146. A pull-down current source is also coupled to the input of the buffer in addition to the output of the current-sense circuit and the zener diode 125 can serve as a voltage clamp to ensure logic levels of, for example 0V and 5V. Consequently, the sustain current, $I_{sustain}$, level can be provided as a digital output signal.

It is thus possible to provide a protection circuit apparatus capable of replacing use of a metallic fuse that uses fusible metal, whilst not drawing undesirably high currents beyond those consumed by a load when the apparatus is not preventing over-currents from flowing. The apparatus is also re-settable. Hence, load protection can be provided at all times. Additionally, by not re-setting the retriggerable fuse when transitioning from the awakened state to the sleep state, knowledge of an over-current event is retained, thereby avoiding damage being caused to the load when the over-current event is still in progress. Of course, the above advantages are exemplary, and these or other advantages may be achieved by embodiments of the invention. Further, the skilled person will appreciate that not all advantages stated above are necessarily achieved by embodiments described herein.

The invention claimed is:

1. A protection circuit apparatus for protecting a load from an over-current, the apparatus comprising:
    a retriggerable fuse comprising a control circuit, the retriggerable fuse having an awakened state and a sleep state, the retriggerable fuse being capable, when in the awakened state, of selectively preventing a load current from flowing from an input to an output thereof in response to the load current exceeding a first current threshold; and
    an activation circuit arranged to sense the load current being drawn and cause the retriggerable fuse to enter the awakened state from the sleep state in response to the sensed load current exceeding a second current threshold;
    wherein the retriggerable fuse has a current-sense output to provide a current-sense output signal indicative that the load current has been sensed, the activation circuit being arranged with the control circuit to use the current-sense output signal to latch the retriggerable fuse in the awakened state, wherein the current-sense output signal is proportional to the load current;
    wherein the retriggerable fuse reverting to the sleep state once the current-sense output signal diminishes below a sustain current level so as to release the latch necessary to maintain the retriggerable fuse in the awakened state.

2. An apparatus as claimed in claim 1, wherein the load current is drawn when the retriggerable fuse is in the sleep state and the load current is less than the second current threshold.

3. An apparatus as claimed in claim 2, wherein the load current is drawn through the retriggerable fuse.

4. An apparatus as claimed in claim 3, wherein the retriggerable fuse comprises another threshold-dependent conduction device, the load current being drawn through the another threshold-dependent conduction device.

5. An apparatus as claimed in claim 1, wherein the retriggerable fuse is arranged to attempt to release the retriggerable fuse from being latched in the awakened state in response to the retriggerable fuse preventing, when in the awakened state, the load current from flowing from the input to the output of the retriggerable fuse.

6. An apparatus as claimed in claim 5, wherein the activation circuit is arranged to maintain the retriggerable fuse in the awakened state in response to the sensed load current continuing to exceed the second current threshold.

7. An apparatus as claimed in claim 6, wherein the retriggerable fuse is a solid-state relay.

8. An apparatus as claimed in claim 1, wherein the activation circuit comprises a threshold-dependent conduction device for transitioning or maintaining the retriggerable fuse in the awakened state, the threshold-dependent conduction device being responsive to the load current drawn exceeding the second current threshold.

9. An apparatus as claimed in claim 8, wherein the threshold-dependent conduction device is a transistor.

10. An apparatus as claimed in claim 9, wherein the transistor is a bipolar transistor.

11. An apparatus as claimed in claim 8, wherein the threshold-dependent conduction device is a voltage comparator.

12. An apparatus as claimed in claim 1, further comprising:
    a processing resource coupled to the retriggerable fuse and arranged to override prevention of flow of the load current from the input to the output of the retriggerable fuse in response to a stimulus external to the processing resource.

13. A method for protecting a load from an over-current, the method comprising:
    detecting that a load current is above a first threshold current;
    transitioning a first transistor to an on state when the load current is above the first threshold current;
    generating an enable signal via the first transistor when the first transistor is in the on state;
    transitioning a retriggerable fuse to an awaken state and a second transistor into an on state in response to the enable signal;
    providing the load current to the load through the second transistor when the second transistor is in the on state;
    generating a current-sense signal that is proportional to the load current via the second transistor;
    detecting that the load current has exceeded an overcurrent threshold based on the current-sense signal;
    placing the second transistor in an off state when the load current has exceeded an overcurrent threshold;
    ceasing a flow of the load current to the load when the second transistor is in the off state;
    transitioning the retriggerable fuse in a sleep state when the load current is below the first current threshold; and
    enabling the flow of the load current to the load when the load current is below a sustain current level.

14. The method of claim 13, further comprising:
    placing the first transistor in an off state when the second transistor is in the on state; and
    transitioning the first transistor to the on state when the load current is above the overcurrent threshold.

15. The method of claim 13, further comprising:
    maintaining the second transistor in the on state while the current-sense signal is above the sustain current level.

16. The method of claim 13, further comprising:
maintaining the retriggerable fuse in the awaken state and the second transistor in the off state continue to cease the flow of the load current to the load while the load current is above the overcurrent threshold.

17. A protection circuit apparatus for protecting a load from an over-current, the apparatus comprising:
an activation circuit including a first transistor transitions to an on state and generates an enable signal when a load current is above a first threshold current; and
a retriggerable fuse including:
a second transistor to provide the load current to the load when the second transistor is in an on state, to generate a current-sense signal that is proportional to the load current, to cease providing the load current to the load when the second transistor is in an off state; and
a control circuit in communication with the activation circuit and the second transistor, the control circuit to transition the retriggerable fuse to an awaken state and to transition the second transistor to the on state in response to receiving the enable signal, to maintain the second transistor in the on state while the current-sense signal is above a sustain current level, to detect that the load current has exceeded an overcurrent threshold based on the current-sense signal, to place the second transistor in the off state when the load current has exceeded the overcurrent threshold, to maintain the retriggerable fuse in the awaken state and the second transistor in the off state while the load current has exceeded the overcurrent threshold, and to transition the retriggerable fuse to a sleep state when the load current is below the sustain current level,
wherein the first transistor transitions to an off state in response to the second transistor transitioning to the on state.

18. The protection circuit apparatus of claim 17, wherein the activation circuit maintains the retriggerable fuse in the awakened state in response to the current-sense signal continuing to exceed the sustain current level.

19. The protection circuit apparatus of claim 17, further comprising:
a processing resource in communication with the retriggerable fuse, the processing resource overrides ceasing of the flow of the load current to the load through the second transistor in response to an override signal.

20. The protection circuit apparatus of claim 19, wherein the override signal is external to the processing resource.

* * * * *